United States Patent [19]

Frerking

[11] 4,449,032
[45] May 15, 1984

[54] VARIABLE GAIN OVEN TEMPERATURE CONTROL CIRCUIT

[75] Inventor: Marvin E. Frerking, Cedar Rapids, Iowa

[73] Assignee: The United States of America as represented by the Secretary of the Air Force, Washington, D.C.

[21] Appl. No.: 465,228

[22] Filed: Feb. 9, 1983

[51] Int. Cl.³ .............................................. H05B 1/02
[52] U.S. Cl. .................... 219/210; 219/501; 219/413; 219/398; 219/494
[58] Field of Search ............... 219/210, 497, 490, 499, 219/504, 505, 483, 486, 494, 395, 396, 398, 501, 413; 236/1 F; 307/38-41; 331/69, 70

[56] References Cited

U.S. PATENT DOCUMENTS

| | | | |
|---|---|---|---|
| 2,825,789 | 3/1958 | Scott | 219/486 |
| 2,984,729 | 5/1961 | Hykes | 219/501 |
| 3,040,158 | 6/1962 | Cutler | 219/210 |
| 3,243,572 | 3/1966 | Vogt | 219/210 |
| 3,428,784 | 2/1969 | Pinckaers | 219/486 |
| 3,548,155 | 12/1970 | Rabindran | 219/483 |
| 3,624,355 | 11/1971 | Friedrichs | 219/497 |
| 3,818,183 | 6/1974 | Masson | 219/483 |
| 3,854,033 | 12/1974 | Edge | 219/483 |
| 4,302,663 | 11/1981 | Chesnut et al. | 219/497 |
| 4,305,005 | 12/1981 | McKenney | 219/483 |
| 4,317,985 | 3/1982 | Wilson | 219/413 |
| 4,333,002 | 6/1982 | Kozak | 219/483 |
| 4,396,892 | 8/1983 | Frerking | 219/210 |

Primary Examiner—B. A. Reynolds
Assistant Examiner—Teresa J. Walberg
Attorney, Agent, or Firm—Donald J. Singer; Bernard E. Franz

[57] ABSTRACT

The frequency of an electronic oscillator is controlled by a crystal located in the oven. The heaters in the oven include resistance elements for quick warm-up, and steady state. The circuit allows the quick warm-up power to be reduced incrementally as the set temperature is approached and effects a smooth transition to the steady-state heater. This is accomplished by circuit features which reduce the control loop gain when high power is applied to the heaters and increase the gain as the warm-up power decreases.

9 Claims, 2 Drawing Figures

VARIABLE GAIN OVEN TEMPERATURE CONTROL CIRCUIT

RIGHTS OF THE GOVERNMENT

The invention described herein may be manufactured and used by or for the Government of the United States for all governmental purposes without the payment of any royalty.

BACKGROUND OF THE INVENTION

This invention relates to a temperature control circuit for an oven, and more particularly to such a circuit for an oven enclosing a crystal which controls the frequency of an electronic oscillator.

A crystal frequency standard of the highest precision requires that the crystal temperature be stabilized and controlled above the upper ambient temperature that the unit will encounter. Unfortunately, when the oscillator is turned on, a warm-up period (minutes) is required before the unit can be used. For many equipments it is highly desirable to minimize this warm-up period. Consequently, large quantities of heat are initially used to bring the oven up to the operating temperature. As larger and larger amounts of heat are used, it becomes increasingly difficult to control the shut-off point for the heaters and to effect a smooth transition to the steady state heaters. The rate of temperature rise may well be several degrees per second and an error in the shut-off time of even a fraction of a second can cause considerable overshoot or undershoot in the temperature. The problem is compounded by the internal temperature rise in the heaters themselves, and if the quick warm-up power is shut off when the outside of the heaters are at the proper temperature, the inside of the heaters being considerably hotter will cause the temperature to increase further.

The problem in brief, is that when a crystal oven is warmed up very rapidly, it is difficult to turn off the quick warm-up power before the temperature of the material inside the heaters and the oven mass in the immediate vicinity of the heaters overshoots the temperature set point.

SUMMARY OF THE INVENTION

The object of the invention is to provide a temperature control circuit for an oven which solves the above problems.

The circuit according to the invention allows the quick warm-up power to be reduced incrementally as the set temperature is approached and also effects a smooth transition to the steady state heaters. This is accomplished by a circuit which reduces the control loop gain when high power is applied to the heaters and increases the gain as the warm-up power decreases. This in effect allows the temperature to rise as quickly as possible commensurate with the ability to control it to a precision equivalent to its distance to the final set temperature of the oven.

Reducing the oven gain initially has the effect of lowering the set temperature when high heater power is required. This occurs because a large error signal is required to produce high power if the servo gain is low. As the power decreases near the set temperature, the rate of temperature change of the oven decreases. We are then able to regulate the temperature more precisely; however, in a conventional design the control loop gain is quite low preventing this from occurring. This is aggravated because the power supplied to the oven varies as the square of the heater voltage. Consequently, the effective gain decreases as the applied power is reduced. If the loop gain can be increased as the power is reduced, the effective set point temperature more nearly approaches the final stabilization temperature. The circuit of this invention allows the loop gain to increase in three steps as the final temperature is approached. The circuit also has the added feature that the fast warm-up heaters turn off as the power is cut back just slightly on the steady state heaters.

DETAILED DESCRIPTION

Figure 1:
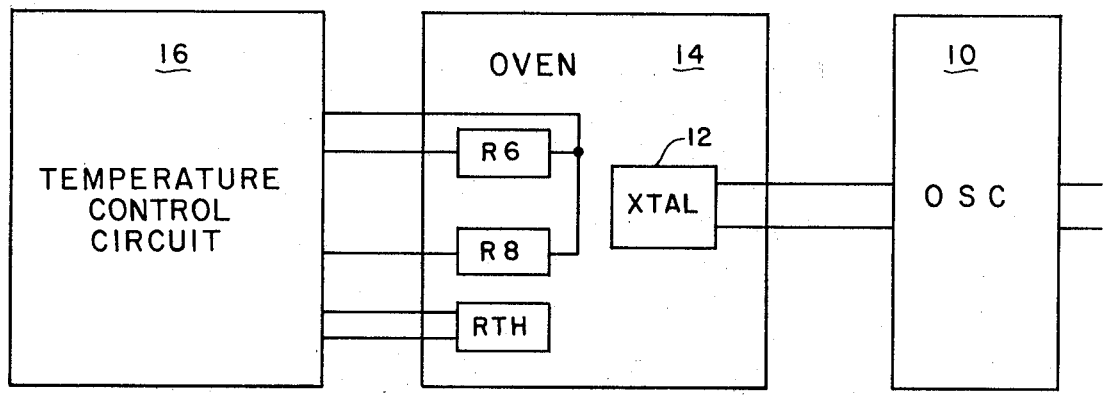
FIG. 1 is a system block diagram of a crystal oscillator with a temperature controlled oven.

FIG. 1 is a block diagram of a system in which the frequency of an oscillator 10 is controlled by a crystal 12 (usually quartz) located in an oven 14. There are two heaters R6 and R8 located in the oven. Each heater is a resistance element whose current is controlled by the temperature control circuit 16. A sensor RTH is also located in the oven, and provides an input signal to the control circuit.

Figure 2:
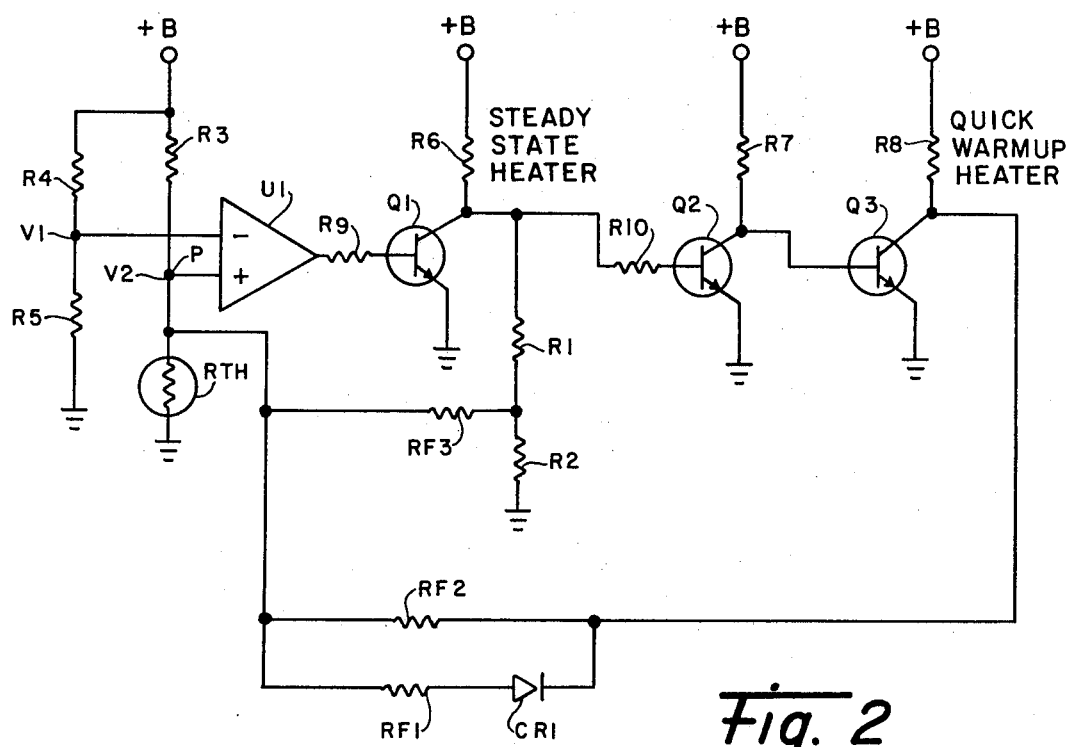
FIG. 2 is a schematic diagram of the heaters and the control circuit.

A schematic diagram of the control circuit 16 is shown in FIG. 2, along with the heaters and sensor. The resistors R6, R7 and R8 each have one terminal connected to a direct current supply voltage +B, and the other terminal connected respectively to the collector electrodes of transistors Q1, Q2 and Q3. The emitter electrodes of these transistors are all grounded. An operational amplifier U1 used as a voltage comparator has a "minus" input terminal connected to the junction of resistors R4 and R5 connected between the supply voltage +B and ground, to provide a reference voltage V1. The "plus" input terminal of comparator U1 is connected to a point P, which is connected via a resistor R3 to the supply +B, and via the sensor thermistor RTH to ground, to provide an input voltage V2. The output of the comparator U1 is connected via a small resistor R9 to the base of transistor Q1. The collector of transistor Q1 is also connected via a small resistor R10 to the base of transistor Q2, and the collector of transistor Q2 is connected to the base of transistor Q3. One feedback path between the collector of transistor Q3 and point P comprises two feedback resistors RF1 and RF2 in parallel, with a diode CR1 in series with resistor RF1. Another feedback path comprises a voltage divider with resistors R1 and R2 in series between the collector of transistor Q1 and ground, with their junction connected via a feedback resistor RF3 to point P.

In this circuit the voltage V2 which is controlled by the temperature sensor thermistor RTH is initially high and decreases as the oven warms up. The initial high voltage causes transistor Q1 to turn on drawing current through the steady state heater R6. The ground potential on the collector of transistor Q1 causes transistor Q2 to be turned off and consequently transistor Q3 is turned on by the current through resistor R7. The quick warm-up heater R8 is then turned on. As the oven warms up and the voltage V2 approaches V1, the transistor Q1 comes out of saturation turning on transistor Q2 which in turn begins to turn off transistor Q3 and cut back on the quick warm-up power. As this happens, the higher potential on the collector of transistor Q3 tends to counteract the voltage drop V2 by means of resistor RF1 and diode CR1. This constitutes negative feedback and results in a low loop gain.

As the oven continues to warm up, eventually the collector of transistor Q3 approaches the voltage V2 causing the diode CR1 to become reverse biased and stop conducting. At that point the negative feedback is controlled by resistor RF2 which has a much larger resistance than resistor RF1 causing the effective gain to increase. As the warm-up continues to progress the voltage on the collector of transistor Q1 increases to about 1 volt and saturates transistor Q2 turning off the quick warm up entirely. The negative feedback is then determined entirely by the resistors R1, R2, and RF3 which allow a very high gain. Effective values of closed loop gain have been found to be 25, 250, and 6000 for the three stages described.

This oven control circuit combined with the dual weighted sensor system described in patent application Ser. No. 226,974, filed Jan. 21, 1981, has allowed the construction of oven frequency standards which stabilize to within $\pm 3 \times 10^{-8}$ in 3 minutes from a turn-on temperature of $-55°$ C. using $95°$ C. oven set temperature. In one case the crystal 12 had a frequency of 5.115 MHz, and the oscillator 10 had a nominal output frequency of 10230000.00 Hertz.

In one exemplary embodiment, with a supply voltage +B of 18 volts, the resistors have the following values:
R1: 20,000 ohms
R2: 200
R3: 34,000
R4: 34,000
R6: 150
R7: 10,000
R8: 15
R9: 3,000
R10: 20,000
RF1: 243,000
RF2: 1,000,000
RF3: 68,000
RTH: 200,000

Transistors Q1 and Q2 may be type 2N2222. Transistor Q3 may be type 2N2222 if the power requirement is not too great, or a similar Darlington pair for higher power. The diode CR1 may be type 1N4454. The value of resistor R5 is selected to provide the optimum temperature for the particular crystal used.

Thus, while preferred constructional features of the invention are embodied in the structure illustrated herein, it is to be understood that changes and variations may be made by the skilled in the art without departing from the spirit and scope of my invention.

I claim:

1. A circuit for controlling the temperature in an oven, comprising:
   a quick warm-up heater and a steady state heater, each comprising an electrical resistance element, located in the oven;
   sensing means located in the oven for sensing the temperature;
   steady-state amplifier means having an input and having an output connected to control the power supplied to the steady-state heater;
   quick warm-up amplifier means having an input and having an output connected to control the power supplied to the quick warm-up heater;
   an input means connected between the sensing means and the input of the steady-state amplifier means, the input means being also coupled to the input of the quick warm-up amplifier means;
   a low-gain feedback means coupled between the quick warm-up amplifier means and the input means;
   a high-gain feedback means coupled between the steady-state amplifier means and the input means;
   the circuit being operative responsive to the sensing means sensing a large difference in temperature in the oven below a predetermined set temperature to fully turn on the quick warm-up amplifier means to apply a maximum power to the quick warm-up heater, until the sensed temperature rises to a value which causes the quick warm-up amplifier means to reduce the power in the quick warm-up heater in a continuous range, causing the low-gain feedback means to become effective, until the sensed temperature reaches a value which causes the quick warm-up amplifier means to be turned off with no significant power in the quick warm-up heater, which causes the high gain feedback means to become effective with the steady-state amplifier means applying power in a continuous range to the steady-state heater, which is then effective to control the temperature very near to the set temperature.

2. A circuit according to claim 1, wherein the quick warm-up amplifier means is coupled to the input means via the steady-state amplifier means and an intermediate amplifier means used as an inverter, with the intermediate amplifier means having an input connected to the output of the steady-state amplifier means and an output connected to the input of the quick warm-up amplifier means.

3. A circuit according to claim 2, which is powered by a direct current source having a supply terminal and a common terminal, wherein each of said amplifier means comprises an amplifying device having an input terminal, an output terminal and a common terminal, each amplifying device having its input and output terminals connected as said input and output respectively of that amplifying means, and its common terminal connected to the common terminal of the direct current source, the output terminal of each amplifying device also being connected via load resistance means to the supply terminal of the direct current source, the quick warm-up and the steady state heaters being respectively the load resistance means of the quick warm-up and the steady-state amplifier means.

4. A circuit according to claim 3, wherein said low-gain feedback means includes switching means for switching from a very low-gain circuit when it initially becomes effective to a moderately low-gain circuit as the sensed temperature rises.

5. A circuit according to claim 4, wherein said input means comprises an operational amplifier operating as a differential amplifier or voltage comparator, having minus and plus input terminals and an output terminal, two resistors connected respectively from the two input terminals to said supply terminal of the direct current source, another resistor connecting the other input terminal to the common terminal of the direct current source, and said sensing means being a resistance device connected from the other input terminal to the common terminal of the direct current supply.

6. A circuit according to claim 5, wherein the low-gain feedback means comprises first and second feedback resistors in parallel connected between the output terminal of the quick warm-up amplifying device and the input terminal of the input means which is connected to the sensing means, wherein said switching means includes a diode in series with the first feedback resistor, the diode becoming reverse biased to effect the switching.

7. A circuit according to claim 6, wherein the high gain feedback means comprises a resistance voltage divider connected to the output terminal of the steady-state warm-up amplifying device, and a third feedback resistor connected from a tap of the voltage divider and the input terminal of the input means which is connected to the sensing means.

8. A circuit according to claim 7, wherein said amplifying devices are transistors connected in a common emitter configuration.

9. A circuit according to claim 7, wherein said amplifying devices are NPN transistors having emitter, base and collector electrodes connected as the common, input and output terminals respectively, said supply terminal is the positive pole of the direct-current source, and the plus terminal of the operational amplifier is connected to the sensing means, all circuit connections are direct-current paths, the operation at said large difference in temperature has the steady-state and quick warm-up amplifying devices at saturation with the intermediate amplifying device at cutoff, as the temperature rises the operation transitions smoothly through the amplification ranges of the amplifying devices until the intermediate amplifying device is in saturation and the quick warm-up device is cutoff, and at higher temperatures approaching the set point only the steady-state amplifying device remains in an operating range between cutoff and saturation.

* * * * *